(12) United States Patent
Schwalm et al.

(10) Patent No.: US 8,481,623 B2
(45) Date of Patent: Jul. 9, 2013

(54) RADIATION-CURABLE COATING MASSES WITH HIGH ADHESION

(75) Inventors: Reinhold Schwalm, Wachenheim (DE); Klaus Menzel, Ludwigshafen (DE); Rainer Klopsch, Worms (DE)

(73) Assignee: BASF SE, Ludwigshafen (DE)

( * ) Notice: Subject to any disclaimer, the term of this patent is extended or adjusted under 35 U.S.C. 154(b) by 412 days.

(21) Appl. No.: 12/665,418

(22) PCT Filed: Jun. 18, 2008

(86) PCT No.: PCT/EP2008/057699
§ 371 (c)(1),
(2), (4) Date: Dec. 18, 2009

(87) PCT Pub. No.: WO2008/155354
PCT Pub. Date: Dec. 24, 2008

(65) Prior Publication Data
US 2010/0184892 A1     Jul. 22, 2010

(30) Foreign Application Priority Data

Jun. 21, 2007  (EP) ................................. 07110742
Jun. 26, 2007  (EP) ................................. 07111019

(51) Int. Cl.
*C08G 18/48*   (2006.01)
(52) U.S. Cl.
USPC ........................................................ 524/130

(58) Field of Classification Search
USPC ........................................................ 524/130
See application file for complete search history.

(56) References Cited

U.S. PATENT DOCUMENTS

| | | | |
|---|---|---|---|
| 7,026,373 B2 * | 4/2006 | Smith et al. | 522/182 |
| 2006/0009589 A1 | 1/2006 | Haering et al. | |
| 2008/0233390 A1 | 9/2008 | Gothlich et al. | |
| 2009/0123742 A1 | 5/2009 | Vandermeulen et al. | |

FOREIGN PATENT DOCUMENTS

| | | | |
|---|---|---|---|
| DE | 26 38 545 | | 4/1977 |
| DE | 198 26 712 | | 12/1999 |
| DE | 199 13 353 | | 9/2000 |
| DE | 199 57 900 | | 6/2001 |
| EP | 1 417 272 | * | 7/2002 |
| EP | 1 277 815 | | 1/2003 |
| EP | 1 417 272 | | 5/2004 |
| EP | 1 678 094 | | 7/2006 |
| WO | 98 33761 | | 8/1998 |
| WO | 99 25780 | | 5/1999 |
| WO | 2006 005491 | | 1/2006 |

OTHER PUBLICATIONS

U.S. Appl. No. 12/663,721, filed Dec. 9, 2009, Schwalm, et al.

\* cited by examiner

*Primary Examiner* — Yong Chu
*Assistant Examiner* — Sonya Wright
(74) *Attorney, Agent, or Firm* — Oblon, Spivak, McClelland, Maier & Neustadt, L.L.P.

(57) ABSTRACT

The present invention relates to radiation-curable coating compositions combining high adhesion with high elasticity.

18 Claims, No Drawings

RADIATION-CURABLE COATING MASSES WITH HIGH ADHESION

The present invention relates to radiation-curable coating compositions combining high adhesion with high elasticity.

EP 1417272 discloses radiation-curable powder coating materials comprising monomers that carry phosphorus-containing groups. One of those specified, within long lists, is vinylphosphoric acid, but it is not used explicitly in any of the examples. Nothing is said concerning elasticity.

DE-A 2638545 describes radiation-curable coating compositions which through admixture of, for example, vinylphosphonic acid exhibit a high level of adhesion to metals. Disclosed explicitly are coating compositions which as well as vinylphosphonic acid and reactive diluents also comprise urethane(meth)acrylates and epoxy(meth)acrylates.

The coating composition disclosed in example 1 is a mixture of a urethane-epoxy methacrylate binder having an average functionality of approximately 4, which is diluted with a mixture of a monofunctional acrylate (n-butyl acrylate) and, as a further reactive diluent, a difunctional methacrylate(1,4-butanediol dimethacrylate) to a solids content of approximately 80%. In coating material 1 of example 1, therefore, approximately 80 mol % of the (meth)acrylate functions are in the form of compounds of relatively high functionality (a functionality of 4). The double-bond density of binder is about 2.5 mol/kg.

A disadvantage of the coating compositions disclosed in DE-A 2638545 is that the coatings obtained with them are very brittle. The breaking extension of these coatings is well below 30%.

It was an object of the present invention to provide radiation-curable coating compositions which produce coatings featuring a high level of adhesion and an elasticity improved over that of DE-A 2638545.

This object has been achieved by means of radiation-curable coating compositions comprising
- (A) vinylphosphonic acid,
- (B) at least one radiation-curable compound having precisely one free-radically polymerizable group,
- (C) at least one radiation-curable compound having precisely two free-radically polymerizable groups, and
- (D) optionally, at least one radiation-curable compound having more than two free-radically polymerizable groups, the sum of the free-radically polymerizable groups in the compounds (D), as a proportion of the total sum of the free-radically polymerizable groups in the compounds (A), (B), (C), and (D), being not more than 20 mol %, preferably not more than 10 mol %, more preferably not more than 5 mol %, and very preferably not more than 2 mol %.

Further of advantage are those coating compositions of the invention that have a double-bond density, based on components (A), (B), (C), and (D), of not more than 2 mol/kg, preferably of not more than 1.5 mol/kg, more preferably of not more than 1.3 mol/kg. The double-bond density ought to be at least 0.3 mol/kg, preferably at least 0.5 mol/kg, more preferably at least 0.7, and very preferably at least 1.0 mol/kg. This double-bond density is the amount of free-radically polymerizable groups with crosslinking activity in the compounds (C) and (D) in the radiation-curable coating composition, in other words the sum of the double bonds in components (A), (B), (C), and (D).

As a result of this lowering of the level of free-radically polymerizable groups it is possible on the one hand to reduce the network density to such an extent that coatings of increased flexibility are obtained, which nevertheless, on the other hand, have a sufficiently high network density to ensure sufficient hardness.

The fraction of vinylphosphonic acid (A) in the coating composition, based on components (A), (B), (C), and (D), is generally 0.1% to 8% by weight, preferably 0.5% to 4% by weight.

In the cured state the coatings obtained with the coating compositions of the invention generally have a breaking extension of 50% or more, preferably 60% or more, more preferably 70% or more, and very preferably 80% or more, measured on self-supporting films with a tensioning speed of 1 mm/min.

The presence of the vinylphosphonic acid (A) enhances the adhesion of the coating compositions, more particularly to coated and uncoated metals. Accordingly, a further component of the present invention is a method of improving the adhesion of radiation-curable coating composition to metallic substrates by giving the radiation-curable coating composition a fraction of 0.1% to 8% by weight of vinylphosphonic acid (A), based on the radiation-curable constituents.

Component (A) of the coating compositions of the invention is vinylphosphonic acid ($H_2C=CH-PO_3H$), which if desired may also be present at least partly in the form of its salts.

By salts in this context are meant the alkali metal, alkaline earth metal or ammonium salts of vinylphosphonic acid, more particularly the sodium, potassium, cesium, magnesium, calcium, and barium salts, especially sodium, potassium, and calcium salts.

Also conceivable are salts formed by reaction with amines or ammonia, examples being those of ammonia, trimethylamine, triethylamine, tri-n-butylamine, diisopropylamine, ethyldiisopropylamine, dimethylbenzylamine, dimethylphenylamine, triethanolamine, diethanolamine, monoethanolamine, morpholine, piperidine, and pyrrolidone.

The proportion of the vinylphosphonic acid in free acid form is preferably 50 to 100 mol %, more preferably 75 to 100 mol %, very preferably 90 to 100 mol %, and more particularly 95 to 100 mol %.

Vinylphosphonic acid may optionally have a water content of up to 10% by weight, for example, 5% to 10% by weight, provided this amount of water is not disruptive in the radiation-curable coating composition.

Also conceivable is the use of vinylphosphonic esters, examples being the esters with aliphatic or cycloaliphatic alcohols or alcohols containing aromatic groups, preferably with aliphatic or cycloaliphatic alcohols, more preferably with aliphatic alcohols, very preferably with alkanols, and more particularly with alkanols containing 1 to 8 carbon atoms.

Examples of such are methyl, ethyl, n-propyl, n-butyl, sec-butyl, isobutyl, tert-butyl, n-hexyl, n-octyl, and 2-ethylhexyl vinylphosphonates. With preference these may be methyl and ethyl vinylphosphonates.

Also conceivable are esters of substituted alcohols. One example of such is 2'-chloroethyl vinylphosphonate.

With particular preference, however, vinylphosphonic acid is used as component (A).

Component (B) is at least one, one to four for example, one to three for preference, more preferably one to two, and very preferably precisely one radiation-curable compound having precisely one free-radically polymerizable group.

Examples of free-radically polymerizable groups are vinyl ether or $\alpha,\beta$-ethylenically unsaturated carboxylic acids, preferably (meth)acrylate groups, more preferably (meth)acrylate groups, and very preferably acrylate groups.

Monofunctional free-radically polymerizable compounds (B) are, for example, esters of α,β-ethylenically unsaturated carboxylic acids, preferably of (meth)acrylic acid, with alcohols containing 1 to 20 C atoms, preferably optionally hydroxyl-substituted alkanols containing 1 to 20 C atoms, e.g., methyl(meth)acrylate, ethyl(meth)acrylate, n-butyl (meth)acrylate, 2-ethylhexyl(meth)acrylate, 2-hydroxyethyl (meth)acrylate, 2-hydroxy-propyl(meth)acrylate or 4-hydroxybutyl(meth)acrylate.

The monoethylenically unsaturated reactive diluent (B) may preferably be a compound (B1), comprising at least one cycloaliphatic group, or a compound (B2), comprising at least one heterocyclic group.

Compounds (B1) are esters of (meth)acrylic acid with cycloalkanols or bicycloalkanols, the cycloalkanol or bicycloalkanol containing from 3 to 20 carbon atoms, preferably from 5 to 10 carbon atoms, and being optionally substituted by $C_1$ to $C_4$ alkyl.

Examples of cycloalkanol and bicycloalkanol are cyclopentanol, cyclohexanol, cyclooctanol, cyclododecanol, 4-methylcyclohexanol, 4-isopropylcyclohexanol, 4-tert-butylcyclohexanol (preferably cis-configured), dihydrodicyclopentadienyl alcohol, and norbornyl alcohol. Preference is given to cyclohexanol and 4-tert-butylcyclohexanol.

As component (B2) it is possible in principle to use all monofunctional esters of α,β-ethylenically unsaturated carboxylic acids with a monofunctional alkanol that has as a structural element at least one saturated 5- or 6-membered heterocycle having one or two oxygen atoms in the ring. Component (B) derives preferably from acrylic acid or methacrylic acid. Examples of suitable compounds of component (B2) comprise compounds of the general formula (I)

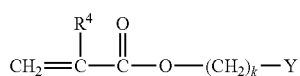

(I)

in which
  $R^4$ is selected from H and $CH_3$ and more particularly is H,
  k is a number from 0 to 4 and more particularly 0 or 1, and
  Y is a 5- or 6-membered, saturated heterocycle having one or two oxygen atoms, the heterocycle being optionally substituted by $C_1$-$C_4$ alkyl, e.g., methyl, ethyl, n-propyl, isopropyl, n-butyl, 2-butyl, isobutyl or tert-butyl.

The 5- or 6-membered saturated heterocycle derives preferably from tetrahydrofuran, tetrahydropyran, 1,3-dioxolane or 1,3- or 1,4-dioxane.

With particular preference component (B2) is selected from trimethylolpropane monoformal acrylate, glycerol monoformal acrylate, 4-tetrahydropyranyl acrylate, 2-tetrahydropyranyl methylacrylate, tetrahydrofurfuryl acrylate, and mixtures of these. Very particular preference is given to using trimethylolpropane monoformal acrylate as component (B2).

Also conceivable, however, albeit less preferred, are vinylaromatic compounds, e.g., styrene, divinylbenzene, α,β-unsaturated nitriles, e.g., acrylonitrile, methacrylonitrile, α,β-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g., cyclopentene, cyclohexene, cyclododecene, N-vinylformamide, allylacetic acid, vinylacetic acid, monoethylenically unsaturated carboxylic acids having 3 to 8 C atoms and also their water-soluble alkali metal, alkaline earth metal or ammonium salts, such as, for example: acrylic acid, methacrylic acid, dimethylacrylic acid, ethylacrylic acid, maleic acid, citraconic acid, methylenemalonic acid, crotonic acid, fumaric acid, mesaconic acid, and itaconic acid, maleic acid, N-vinylpyrrolidone, N-vinyl lactams, such as N-vinylcaprolactom, N-vinyl-N-alkylcarboxamides or N-vinylcarboxamides, such as N-vinylacetamide, N-vinyl-N-methylformamide, and N-vinyl-N-methylacetamide, or vinyl ethers, examples being methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether, and also mixtures of these.

Component (C) is at least one, one to four for example, one to three for preference, more preferably one to two, and very preferably precisely one radiation-curable compound having precisely two free-radically polymerizable groups.

Component (D) is at least one, one to four for example, one to three for preference, more preferably one to two, and very preferably precisely one radiation-curable compound having more than 2, preferably 3-10, more preferably 3-6, very preferably 3-4, and more particularly 3 free-radically polymerizable groups.

Preferably components (C) and (D) are selected independently of one another from the group consisting of polyfunctional(meth)acrylic esters (C1) and/or (D1)
  polyester(meth)acrylates (C2) and/or (D2)
  polyether(meth)acrylates (C3) and/or (D3)
  urethane(meth)acrylate (C4) and/or (D4)
  epoxy(meth)acrylates (C5) and/or (D5)
  (meth)acrylated polyacrylates (C6) and/or (D6), or
  carbonate(meth)acrylates (C7) and/or (D7).

These may for example be esters of α,β-ethylenically unsaturated carboxylic acids, preferably of (meth)acrylic acid, more preferably of acrylic acid with polyalcohols having a corresponding functionality of at least two.

Suitable examples of polyalcohols of this kind are at least dihydric polyols, polyetherols or polyesterols or polyacrylatepolyols having an average OH functionality of at least 2, preferably 3 to 10.

Examples of polyfunctional polymerizable compounds (C1) are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, and 1,2-, 1,3- or 1,4-cyclohexandiol diacrylate.

Examples of polyfunctional polymerizable compounds (D1) are trimethylolpropane triacrylate, ditrimethylolpropane pentaacrylate or hexaacrylate, pentaerythritol triacrylate or tetraacrylate, glycerol diacrylate or triacrylate, and also diacrylates and polyacrylates of sugar alcohols, such as of sorbitol, mannitol, diglycerol, threitol, erythritol, adonitol (ribitol), arabitol (lyxitol), xylitol, dulcitol (galactitol), maltitol or isomalt, for example.

Further examples of (C1) and/or (D1) are (meth)acrylates of compounds of the formula (IIa) to (IId),

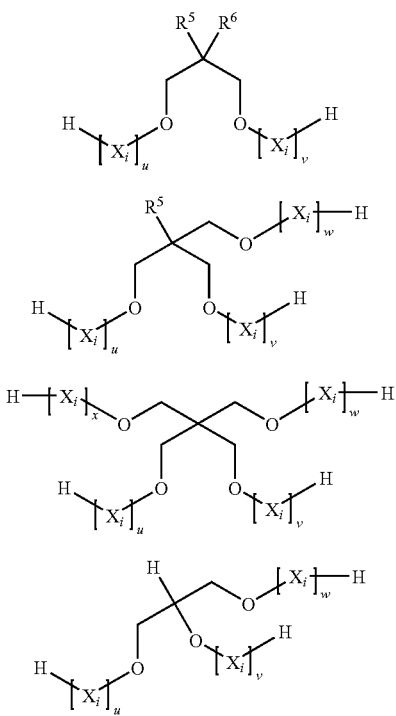

in which
R⁵ and R⁶ independently of one another are hydrogen or are $C_1$-$C_{18}$ alkyl optionally substituted by aryl, alkyl, aryloxy, alkyloxy, heteroatoms and/or heterocycles,
u, v, w, and x independently of one another are each an integer from 1 to 10, preferably 1 to 5, and more preferably 1 to 3, and each $X_i$, for i=1 to u, 1 to v, 1 to w, and 1 to x, can be selected independently of the others from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh—O—, and —CHPh—$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—,
in which Ph is phenyl and Vin is vinyl.

In these definitions, $C_1$-$C_{18}$ alkyl optionally substituted by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

The compounds in question are preferably (meth)acrylates of singly to viginetuply and, more preferably, triply to decuply ethoxylated, propoxylated or mixedly ethoxylated and propoxylated, and more particularly exclusively ethoxylated, neopentyl glycol, trimethylolpropane, trimethylolethane or pentaerythritol.

Preferred polyfunctional polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, and triacrylate of singly to viginetuply alkoxylated, more preferably ethoxylated, trimethylolpropane.

Especially preferred polyfunctional polymerizable compounds are 1,4-butanediol diacrylate, 1,6-hexanediol diacrylate, trimethylolpropane triacrylate, pentaerythritol tetraacrylate, and triacrylate of singly to viginetuply ethoxylated trimethylolpropane.

Polyester(meth)acrylates (C2) and/or (D2) are the corresponding esters of α,β-ethylenically unsaturated carboxylic acids, preferably of (meth)acrylic acid, more preferably of acrylic acid, with polyesterpolyols.

Polyesterpolyols are known for example from Ullmanns Encyklopädie der technischen Chemie, 4th Edition, Volume 19, pp. 62 to 65. Preference is given to using polyesterpolyols obtained by reacting dihydric alcohols with dibasic carboxylic acids. In place of the free polycarboxylic acids it is also possible to use the corresponding polycarboxylic anhydrides or corresponding polycarboxylic esters of lower alcohols, or mixtures thereof, to prepare the polyesterpolyols. The polycarboxylic acids may be aliphatic, cycloaliphatic, araliphatic, aromatic or heterocyclic and may if desired be substituted, by halogen atoms for example, and/or unsaturated. Examples thereof that may be mentioned include the following:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, such as $C_1$-$C_4$ alkyl esters, preferably methyl, ethyl or n-butyl esters, of the stated acids are employed. Preference is given to dicarboxylic acids of the general formula HOOC—$(CH_2)_y$—COON, y being a number from 1 to 20, preferably an even number from 2 to 20, and particular preference to succinic acid, adipic acid, sebacic acid, and dodecanedicarboxylic acid.

Polyhydric alcohols contemplated for the preparation of the polyesterols include 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF with a molar mass between 162 and 2000, poly-1,3-propanediol with a molar mass between 134 and 1178, poly-1,2-propanediol with a molar mass between 134 and 898, polyethylene glycol with a molar mass between 106 and 458, neopentyl glycol, neopentyl glycol hydroxypivalate, 2-ethyl-1,3-propanediol, 2-methyl-1,3-propanediol, 2,2-bis(4-hydroxy-cyclohexyl)propane, 1,1-, 1,2-, 1,3-, and 1,4-cyclohexanedimethanol, 1,2-, 1,3- or 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if desired may be alkoxylated as described above.

Preference is given to alcohols of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Preference additionally is given to neopentyl glycol.

Also contemplated, furthermore, are polycarbonatediols of the kind obtainable, for example, by reacting phosgene with an excess of the low molecular mass alcohols specified as synthesis components for the polyesterpolyols.

Also suitable are lactone-based polyesterdiols, which are homopolymers or copolymers of lactones, preferably hydroxyl-terminated adducts of lactones with suitable difunctional starter molecules. Lactones contemplated are preferably those deriving from the compounds of the general formula HO—(CH$_2$)$_z$—COOH, z being a number from 1 to 20, and it also being possible for one H atom of a methylene unit to have been substituted by a C$_1$ to C$_4$ alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and also their mixtures. Suitable starter components are, for example, the low molecular mass dihydric alcohols specified above as a synthesis component for the polyesterpolyols. The corresponding polymers of ε-caprolactone are particularly preferred. Lower polyesterdiols or polyetherdiols can also be used as starters for preparing the lactone polymers. In place of the polymers of lactones it is also possible to use the corresponding, chemically equivalent polycondensates of the hydroxycarboxylic acids corresponding to the lactones.

Polyether(meth)acrylates (C3) and/or (D3) are the corresponding esters of α,β-ethylenically unsaturated carboxylic acids, preferably of (meth)acrylic acid, more preferably of acrylic acid, with polyetherols.

The polyetherols are preferably polyethylene glycol with a molar mass between 106 and 2000, preferably 106 to 1500, more preferably 106 to 1000, poly-1,2-propanediol with a molar mass between 134 and 1178, poly-1,3-propanediol with a molar mass between 134 and 1178, and polytetrahydrofurandiol having a number-average molecular weight M$_n$ in the range from about 500 to 4000, preferably 600 to 3000, more particularly 750 to 2000.

Urethane(meth)acrylates (C4) and/or (D4) are obtainable, for example, by reacting polyisocyanates with hydroxyalkyl (meth)acrylates or hydroxyalkyl vinyl ethers and, if desired, chain extenders such as diols, polyols, diamines, polyamines or dithiols or polythiols. Urethane(meth)acrylates dispersible in water without addition of emulsifiers additionally comprise ionic and/or nonionic hydrophilic groups, which are introduced into the urethane through synthesis components, for example, such as hydroxycarboxylic acids.

Such urethane(meth)acrylates substantially comprise as synthesis components:
(a) at least one organic aliphatic, aromatic or cycloaliphatic di- or polyisocyanate,
(b) at least one compound having at least one isocyanate-reactive group and at least one free-radically polymerizable unsaturated group, and
(c) if desired, at least one compound having at least two isocyanate-reactive groups.

The urethane(meth)acrylates preferably have a number-average molar weight M$_n$ of 500 to 20 000, more particularly of 500 to 10 000, with particular preference 600 to 3000 g/mol (as determined by gel permeation chromatography using tetrahydrofuran and polystyrene as standard).

The urethane(meth)acrylates preferably have a (meth)acrylic group content of 1 to 5, more preferably of 2 to 4 mol of (meth)acrylic groups per 1000 g of urethane(meth)acrylate.

Epoxide(meth)acrylates (C5) and/or (D5) are obtainable by reacting epoxides with (meth)acrylic acid. Examples of epoxides contemplated include epoxidized olefins, aromatic glycidyl ethers or aliphatic glycidyl ethers, preferably those of aromatic or aliphatic glycidyl ethers.

Epoxidized olefins may for example be ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene) (CAS No. [13446-85-0]), tris[4-(2,3-epoxypropoxy)phenyl]methane isomers) (CAS No. [66072-39-7]), phenol-based epoxy novolaks (CAS No. [9003-35-4]), and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ethers of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane, CAS No. [13410-58-7]).

The epoxide(meth)acrylates and epoxide vinyl ethers preferably have a number-average molar weight M$_n$ of 200 to 20 000, more preferably of 200 to 10 000 g/mol, and very preferably of 250 to 3000 g/mol; the (meth)acrylic group or vinyl ether group content is preferably 1 to 5, more preferably 2 to 4 per 1000 g of epoxide(meth)acrylate or vinyl ether epoxide (as determined by gel permeation chromatography using polystyrene as standard and tetrahydrofuran as eluent).

(Meth)acrylated polyacrylates (C6) and/or (D6) are the corresponding esters of α,β-ethylenically unsaturated carboxylic acids, preferably of (meth)acrylic acid, more preferably of acrylic acid, with polyacrylate polyols.

Polyacrylate polyols of this kind preferably have molecular weight M$_n$ of at least 1000, more preferably at least 2000, and very preferably at least 5000 g/mol. The molecular weight M$_n$ can for example be up to 200 000, preferably up to 100 000, more preferably up to 80 000, and very preferably up to 50 000 g/mol.

Preferred OH numbers of polyacrylate polyols, measured in accordance with DIN 53240-2, are 15-250 mg KOH/g, preferably 80-160 mg KOH/g.

Additionally the polyacrylate polyols may have an acid number in accordance with DIN EN ISO 3682 of up to 200 mg KOH/g, preferably up to 150, and more preferably up to 100 mg KOH/g.

The polyacrylate polyols are copolymers of at least one (meth)acrylic ester with at least one compound having at least one, preferably precisely one hydroxyl group and at least one, preferably precisely one (meth)acrylate group.

The latter may be, for example, monoesters of α,β-unsaturated carboxylic acids, such as acrylic acid, methacrylic acid (referred to in this document for short as "(meth)acrylic acid"), with diols or polyols, which have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentarythritol, sorbitol, mannitol, diglycerol, threitol, erythritol, adonitol (ribitol), arabitol (lyxitol), xylitol, dulcitol (galactitol), maltitol, isomalt, polyTHF with a molar weight between 162 and 4500, preferably 250 to 2000, poly-1,3-propanediol or polypropylene glycol with a molar weight between 134 and 2000, or polyethylene glycol with a molar weight between 238 and 2000.

Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

The monomers which carry hydroxyl groups are used in the copolymerization in a mixture with other polymerizable monomers, preferably free-radically polymerizable monomers, preferably those composed to an extent of more than 50% by weight of $C_1$-$C_{20}$, preferably $C_1$ to $C_4$ alkyl(meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures of these. Particularly preferred are the polymers composed to an extent of more than 60% by weight of $C_1$-$C_{10}$-alkyl(meth)acrylates, styrene, vinylimidazole or mixtures of these.

The polymers may further comprise hydroxyl-functional monomers corresponding to the above hydroxyl group content, and, if desired, further monomers, examples being glycidyl epoxy esters of (meth)acrylic acid, or ethylenically unsaturated acids, more particularly carboxylic acids, acid anhydrides or acid amides.

Carbonate(meth)acrylates (C7) and/or (D7) are likewise obtainable with different functionalities.

The number-average molecular weight $M_n$ of the carbonate (meth)acrylates is preferably less than 3000 g/mol, more preferably less than 1500 g/mol, more preferably less than 800 g/mol (as determined by gel permeation chromatography using polystyrene as standard; solvent: tetrahydrofuran).

The carbonate(meth)acrylates are obtainable in a simple way by transesterification of carbonic esters with polyhydric, preferably dihydric, alcohols (diols, e.g., hexanediol) and subsequent esterification of the free OH groups with (meth)acrylic acid, or else transesterification with (meth)acrylic esters, as described in EP-A 92 269, for example. They are also obtainable by reaction of phosgene, urea derivatives with polyhydric alcohols, dihydric alcohols for example.

Obtainable in a similar way are vinyl ether carbonates, by reaction of a hydroxyalkyl vinyl ether with carbonic esters and also, if desired, dihydric alcohols.

Also conceivable are (meth)acrylates or vinyl ethers of polycarbonate polyols, such as the reaction product of one of the stated diols or polyols and a carbonic ester and also a hydroxyl-containing (meth)acrylate or vinyl ether.

Examples of suitable carbonic esters are ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl(meth)acrylate, 2- or 3-hydroxypropyl (meth)acrylate, 1,4-butanediol mono(meth)acrylate, neopentyl glycol mono(meth)acrylate, glycerol mono(meth)acrylate and di(meth)acrylate, trimethylolpropane mono(meth)acrylate and di(meth)acrylate, and also pentaerythritol mono (meth)acrylate, di(meth)acrylate, and tri(meth)acrylate.

Examples of suitable hydroxyl-containing vinyl ethers are 2-hydroxyethyl vinyl ether and 4-hydroxybutyl vinyl ether.

Particularly preferred carbonate(meth)acrylates are those of the formula:

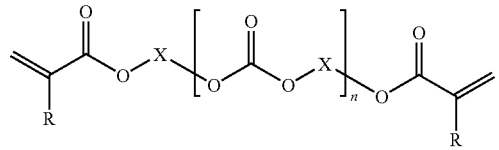

in which R is H or $CH_3$, X is a $C_2$-$C_{18}$ alkylene group, and n is an integer from 1 to 5, preferably from 1 to 3.

R is preferably H, and X is preferably $C_2$ to $C_{10}$ alkylene, exemplified by 1,2-ethylene, 1,2-propylene, 1,3-propylene, 1,4-butylene or 1,6-hexylene, or more preferably $C_4$ to $C_8$ alkylene. With very particular preference X is $C_6$ alkylene.

The carbonate(meth)acrylates are preferably aliphatic carbonate(meth)acrylates.

Particular preference among the polyfunctional polymerizable compounds is given to urethane(meth)acrylates (C4) and/or (D4).

In a preferred embodiment of the present invention at least one of the components, (C) or (D), has a diol as a synthesis component, selected from the group consisting of polytetrahydrofurandiol (H—[—O—$CH_2$—$CH_2$—$CH_2$—$CH_2$—]$_k$—OH), polyethylene glycol (H—[—O—$CH_2$—$CH_2$—]$_k$—OH), polypropylene glycol, H—[—O—$CH_2$—$CH(CH_3)$—]$_k$—OH polycaprolactonediol (—[—O—$CH_2$—$CH_2$—$CH_2$—$CH_2$—$CH_2$—(CO)—]$_k$—$R^1$—OH), and polyesterdiol (HO—[$R^1$—O—(CO)—$R^2$—(CO)—O—$R^1$—]$_k$—OH) with a number-average molar mass of 500 to 4000.

In the above formulae $R^1$ and $R^2$ independently of one another are a divalent aliphatic or cycloaliphatic radical having at least one carbon atom and k is a positive integer needed in order to obtain the molar mass in question.

Preferred radicals $R^1$ and $R^2$ are, independently of one another, methylene, 1,2-ethylene, 1,2-propylene, 1,3-propylene, 1,2-, 1,3- or 1,4-butylene, 1,1-dimethyl-1,2-ethylene or 1,2-dimethyl-1,2-ethylene, 1,5-pentylene, 1,6-hexylene, 1,8-octylene, 1,10-decylene or 1,12-dodecylene.

Diols of this kind further enhance the flexibility of the resulting coatings.

Based on the sum of the compounds (A), (B), (C), and (D), the coating compositions of the invention may further comprise 0% to 10% by weight of at least one photoinitiator (E).

Photoinitiators (E) may be, for example, photoinitiators known to the skilled worker, examples being those specified in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (ed.), SITA Technology Ltd, London.

Suitable photoinitiators are those of the kind described in WO 2006/005491 A1, page 21, line 18 to page 22, line 2 (corresponding to US 2006/0009589 A1, paragraph [0150]), which is hereby incorporated by reference as part of the present disclosure.

Also suitable are nonyellowing or low-yellowing photoinitiators of the phenylglyoxalic ester type, as described in DE-A 198 26 712, DE-A 199 13 353 or WO 98/33761.

Preference among these photoinitiators is given to 2,4,6-trimethylbenzoyldiphenyl-phosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

Based on the sum of the compounds (A), (B), (C), and (D), the coating compositions of the invention may further comprise 0% to 10% by weight of further, typical coatings additives (F).

Examples of further typical coatings additives (F) that can be used include antioxidants, stabilizers, activators (accelerants), fillers, pigments, dyes, antistats, flame retardants, thickeners, thixotropic agents, surface-active agents, viscosity modifiers, plasticizers or chelating agents.

It is further possible to add one or more thermally activable initiators, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activable initiators which have a half-life at 80° C. of more than 100 hours, such as di-tert-butyl peroxide, cumene hydroperoxide, dicumyl peroxide, tert-butyl perbenzoate, silylated pinacols, which are available commercially under the trade name ADDID 600 from Wacker, for example, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd Ed., Wiley & Sons, New York.

Thickeners contemplated include not only free-radically (co)polymerized (co)polymers but also typical organic and inorganic thickeners such as hydroxymethylcellulose or bentonite.

Examples of chelating agents which can be used include ethylenediamineacetic acid and the salts thereof, and also β-diketones.

Suitable fillers comprise silicates, examples being silicates obtainable by silicon tetrachloride hydrolysis, such as Aerosil® from Degussa, silicious earth, talc, aluminum silicates, magnesium silicates, and calcium carbonates, etc.

Suitable stabilizers comprise typical UV absorbers such as oxanilides, triazines, and benzotriazole (the latter available as Tinuvin® products from Ciba-Spezialitätenchemie), and benzophenones. They can be used alone or together with suitable free-radical scavengers, examples being sterically hindered amines such as 2,2,6,6-tetramethylpiperidine, 2,6-di-tert-butylpiperidine or derivatives thereof, such as bis(2,2,6,6-tetramethyl-4-piperidyl) sebacate, for example. Stabilizers are used typically in amounts from 0.1% to 5.0% by weight, based on the solid components comprised in the preparation.

The coating compositions may further comprise a solvent, examples being butyl acetate, ethyl acetate, methoxypropyl acetate, toluene, xylene, fluorinated aromatics, and aliphatic and aromatic hydrocarbon mixtures.

Preferably, however, the coating compositions are applied free from solvent.

The coating compositions of the invention are particularly suitable for coating coated or uncoated metals.

More particularly the coating compositions of the invention are used in coilcoating. For this purpose the surfaces of the metallic substrates may have been treated with oil and also, if desired, may have been primed.

Coilcoating is the continuous coating of metal strips with coating materials that are usually in liquid form. Rolled metal strips, following production, are wound up to form rolls (referred to as coils) for the purposes of storage and transport. These metal strips make up the starting material for the majority of sheetlike metallic workpieces, examples being automobile parts, bodywork parts, appliance paneling, exterior architectural paneling, ceiling paneling or window profiles. For this purpose the appropriate metal sheets are shaped by means of appropriate techniques such as punching, drilling, folding, profiling and/or deep-drawing. Larger components, such as automobile bodies, for example, are assembled if desired by welding together from a number of individual parts.

For the coating operation, metal strips with a thickness of 0.2 to 2 mm and a width of up to 2 m are transported at a speed of up to 200 m/min through a coilcoating line, and are coated in the process. For this purpose it is possible to make use, for example, of cold-rolled strips of soft steels or construction-grade steels, electrolytically galvanized thin sheet, hot-dip-galvanized steel strip, or strips of aluminum or aluminum alloys. Typical lines comprise a feed station, a coil store, a cleaning and pretreatment zone, a first coating station along with baking oven and downstream cooling zone, a second coating station with oven, laminating station, and cooling, and also a coil store and winder.

Characteristic of coilcoatings are thin coats of the coating compositions, with a dry film thickness of usually well below 80 μm, often below 60 μm, below 50 μm, and even below 40 μm. Moreover, the sheets are processed with a high throughput, which necessitates short residence times, in other words necessitates drying at elevated temperature following application of the coating, in order that the coating composition rapidly acquires load-bearing capacity.

The coating of the substrates with the coating compositions of the invention takes place in accordance with typical methods known to the skilled worker, in which a coating composition of the invention or a surface-coating formulation comprising it is applied to the target substrate in the desired thickness and if desired is dried. This operation may be repeated one or more times if desired. Application to the substrate may take place in a known way, as for example by spraying, troweling, knifecoating, brushing, rolling, rollercoating, pouring, laminating, injection backmolding or coextruding. The coating material may also be applied electrostatically in the form of powder (powdercoating materials). The coating thickness is generally situated in a range from about 3 to 1000 g/m² and preferably 10 to 200 g/m².

Further disclosed is a method of coating substrates by applying to the substrate a coating composition of the invention or a surface-coating formulation comprising it, admixed if desired with further, typical coatings additives and thermally curable, chemically curable or radiation-curable resins, and drying it if desired, carrying out curing with electron beams or UV exposure under an oxygen-containing atmosphere or, preferably, under inert gas, and carrying out thermal treatment, if desired at temperatures up to the level of the drying temperature, and subsequently at temperatures up to 160° C., preferably between 60 and 160° C., more preferably between 100 and 160° C.

The radiation cure takes place with high-energy light, examples being UV light or electron beams. The radiation cure may take place at relatively high temperatures. Preference is given in this case to a temperature above the $T_g$ of the radiation-curable binder.

Radiation curing here means the free-radical polymerization of polymerizable compounds as a result of electromagnetic and/or particulate radiation, preferably UV light in a wavelength range of λ=200 to 700 nm and/or electron radiation in the range from 150 to 300 keV, and with particular preference with a radiation dose of at least 80, preferably 80 to 3000, mJ/cm².

Besides radiation curing, there may also be other curing mechanisms involved, examples being thermal, moisture, chemical and/or oxidative curing, preferably thermal and radiation curing, and more preferably radiation curing alone.

The drying and curing of the coatings take place in general under standard temperature conditions, i.e., without the coating being heated. Alternatively the mixtures of the invention can be used for producing coatings which, following application, are dried at an elevated temperature, as for example at 40-250° C., preferably 40-150° C., and more particularly at 40 to 100° C., and cured. This is limited by the thermal stability of the substrate.

Disclosed, moreover, is a method of coating substrates by applying to the substrate the coating composition of the invention or surface-coating formulations comprising it, admixed if desired with thermally curable resins, drying the applied coating, and then carrying out curing with electron beams or UV exposure under an oxygen-containing atmosphere or, preferably, under inert gas, if desired at temperatures up to the level of the drying temperature.

The method of coating substrates can also be carried out by first proceeding, following the application of the coating composition of the invention or surface-coating formulations, to irradiation with electron beams or UV exposure under oxygen or, preferably, under inert gas, in order to obtain preliminary curing, and then carrying out thermal treatment at temperatures up to 160° C., preferably between 60 and 160° C., and thereafter curing to completion with electron beams or UV exposure under oxygen or, preferably, under inert gas.

If desired it is possible, if two or more layers of the coating material are applied one on top of the other, for drying and/or radiation curing to take place after each coating operation.

Examples of suitable radiation sources for the radiation cure are low-pressure, medium-pressure, high-pressure mercury lamps and also fluorescent tubes, pulsed lamps, metal halide lamps, electronic flash devices, which allow radiation curing without photoinitiator, or excimer lamps. The radiation cure is accomplished by exposure to high-energy radiation, i.e., UV radiation or daylight, preferably light in a wavelength range of λ=200 to 700 nm, more preferably of λ=200 to 500 nm, and very preferably of λ=250 to 400 nm, or by bombardment with high-energy electrons (electron radiation; 150 to 300 keV). Examples of radiation sources used include high-pressure mercury vapor lamps, lasers, pulsed lamps (flash light), halogen lamps or excimer lamps. The radiation dose typically sufficient for crosslinking in the case of UV curing is situated in the range from 80 to 3000 mJ/cm².

It will be appreciated that it is also possible to employ two or more radiation sources for the cure, two to four for example.

These sources may also each emit in different wavelength ranges.

In addition to or instead of the thermal treatment, drying and/or thermal treatment may also take place by NIR radiation, with NIR radiation here referring to electromagnetic radiation in the wavelength range from 760 nm to 2.5 μm, preferably from 900 to 1500 nm.

Irradiation may also be carried out, if desired, in the absence of oxygen, such as under an inert gas atmosphere, for example. Suitable inert gases are preferably nitrogen, noble gases, carbon dioxide, or combustion gases. Irradiation may take place, furthermore, with the coating composition covered with transparent media. Examples of transparent media are polymeric films, glass or liquids, water for example. Particular preference is given to irradiation in the manner described in DE-A1 199 57 900.

It is an advantage of the present invention that, with the coating compositions of the invention, coatings are obtained which adhere well and combine good hardness with high flexibility.

The examples given below are intended to illustrate the invention, but without imposing any restriction on it.

The % and ppm FIGURES given in this specification refer to % by weight and ppm by weight, unless indicated otherwise.

EXAMPLES

Binder 1

Preparation of a flexible difunctional urethane acrylate with molecular weight >1500 g/mol:

79 parts of polytetrahydrofurandiol with a molecular weight of 1000 g/mol, 54 parts of a reaction product of caprolactone with hydroxyethyl acrylate (TONE® M100, Dow Chemical), 54 parts of trimethylolpropane formal monoacrylate, 0.1 part of hydroquinone monomethyl ether, and 0.02 part of dibutyltin dilaurate were charged to a round bottomed flask, this initial charge was heated to 60° C., and 35 parts of isophorone diisocyanate were added dropwise over 15 minutes. Reaction was allowed to continue at 80° C. for a further 8 hours. When the NCO value had dropped to zero, the product obtained was filtered through a 50 μm filter and discharged. The resulting urethane acrylate had a viscosity of 10 Pas (at 23° C.).

Binder 2

The procedure of example 1 was repeated but with trimethylolpropane formal monoacrylate replaced by 4-tert-butylcyclohexyl acrylate. The resulting urethane acrylate had a viscosity of 8 Pas (23° C.).

Binder 3

Preparation of a flexible difunctional urethane acrylate (ex. 1 of EP 1678094):

450 parts of polytetrahydrofurandiol with a molecular weight of 1000 g/mol, 105 parts of hydroxyethyl acrylate, 250 parts of trimethylolpropane formal monoacrylate, 0.4 part of hydroquinone monomethyl ether, and 0.1 part of dibutyltin dilaurate were charged to a round bottomed flask, this initial charge was heated to 80° C., and 200 parts of isophorone diisocyanate were added dropwise over 30 minutes. Reaction was allowed to continue at 80° C. for a further 5 hours. When the NCO value had dropped to zero, the product obtained was filtered through a 50 μm filter and discharged. The resulting urethane acrylate had a viscosity of 15 Pas (at 23° C.).

Production of Varnishes and Application:

96 parts of each of the urethane acrylates prepared were admixed with 4 parts in each case of the photoinitiator 2-hydroxy-2-methyl-1-phenylpropan-1-one (Darocure® 1173, Ciba), the composition was mixed thoroughly on a roller bed for approximately 2 hours, and the varnish mixture was applied using a 100 μm Erichsen box-type coating bar to glass plates or Bonder panels. The films thus applied were then exposed on a UV coating unit from IST-Metz with 1350 mJ/cm².

The properties of the varnish films were as follows:

| Without vinylphosphonic acid | Pendulum damping (s) | Erichsen cupping (mm) | Breaking extension (%) |
|---|---|---|---|
| Binder 1 | 18 | >9.5 | 89 |
| Binder 2 | 6 | >9.5 | 109 |
| Binder 3 | 9 | >9.5 | 81 |

Pendulum Damping (Based on DIN 53157)

100 μm wet film thickness, exposure with a high-pressure Hg lamp, 120 W/cm; substrate distance 10 cm; belt speed 2×10 m/min; pendulum apparatus according to DIN 53157 (König); result in sec.

Erichsen Cupping (Based on DIN 53156)

50 μm wet film thickness with wire-wound doctor; exposure with a high-pressure Hg lamp, 120 W/cm; substrate distance 10 cm; belt speed 2×10 m/min; Erichsen cupping according to DIN 53156; result in mm.

96 parts of each of the urethane acrylates prepared were admixed with 4 parts in each case of the photoinitiator 2-hydroxy-2-methyl-1-phenylpropan-1-one (Darocure® 1173, Ciba), and additionally with 1 or 4 parts of vinylphosphonic acid (VPA), the composition was mixed thoroughly on a roller bed for approximately 2 hours, and the varnish mixture was applied using a 100 μm Erichsen box-type coating bar to steel sheets. The films thus applied were then exposed on a UV coating unit from IST-Metz with 1350 mJ/cm².

The properties of the varnish films were as follows:

|  | Rust creep without VPA | Adhesion rating 1 part VPA | Adhesion rating 4 parts VPA |
|---|---|---|---|
| Binder 1 | total loss of adhesion | 10-15 mm | 5-8 mm |
| Binder 2 | total loss of adhesion | 5-10 mm | 0-2 mm |
| Binder 3 | total loss of adhesion | 8-12 mm | 2-4 mm |

Measurement Conditions:

Rust creep at the scribe mark after 240 h of salt spray testing (for which purpose the aforementioned examples were applied as a UV primer formulation at 6 μm and overcoated with a conventional coil topcoat material)

The adhesion rating reported is the loss of adhesion in mm, originating from a scored cross (the smaller the FIGURE, the better the adhesion).

The invention claimed is:

1. A liquid radiation-curable coating composition comprising
    (A) vinylphosphonic acid,
    (B) at least one radiation-curable compound having precisely one free-radically polymerizable group,
    (C) at least one radiation-curable compound having precisely two free-radically polymerizable groups, and
    (D) optionally, at least one radiation-curable compound having more than two free-radically polymerizable groups,
        wherein the sum of the free-radically polymerizable groups in the compounds (D), as a proportion of the total sum of the free-radically polymerizable groups in the compounds (A), (B), (C), and (D), is not more than 20 mol %,
    wherein the amount of vinylphosphonic acid (A), based on components (A), (B), (C), and (D), is 0.1% to 8% by weight.

2. The liquid coating composition according to claim 1, wherein the double-bond density, based on components (A), (B), (C), and (D), is not more than 2 mol/kg.

3. The liquid coating composition according to claim 1, wherein the double-bond density, based on components (A), (B), (C), and (D), is at least 0.3 mol/kg.

4. The liquid coating composition according to claim 1, wherein the coating obtained has a breaking extension in the cured state of 50% or more, measured on self-supporting films with a tensioning speed of 1 mm/min.

5. The liquid coating composition according to claim 1, wherein the compound (B) is selected from the group consisting of (meth)acrylic esters of optionally hydroxyl-substituted alkanols containing 1 to 20 C atoms, of cycloalkanols or bicycloalkanols having 3 to 20 carbon atoms, and of monofunctional alcohols which contain as a structural element at least one saturated 5- or 6-membered heterocycle having one or two oxygen atoms in the ring.

6. The liquid coating composition according to claim 1, wherein the compounds (C) and (D) are selected independently of one another from the group consisting of
    polyfunctional (meth)acrylic esters
    polyester (meth)acrylates
    polyether (meth)acrylates
    urethane (meth)acrylates
    epoxy (meth)acrylates
    (meth)acrylated polyacrylates, and
    carbonate (meth)acrylates.

7. The liquid coating composition according to claim 1, wherein at least one of the components, (C) or (D), has a diol as a synthesis component, selected from the group consisting of polytetrahydrofurandiol, polyethylene glycol, polypropylene glycol, polycaprolactonediol, and polyesterdiol having a number-average molar mass of 500 to 4000.

8. A coating for coated or uncoated metals comprising the liquid coating composition according to claim 1.

9. A coilcoating composition comprising the liquid coating composition according to claim 1 in cured form.

10. The liquid radiation-curable coating composition according to claim 1, comprising a difunctional urethane acrylate.

11. The liquid radiation-curable coating composition according to claim 10, wherein the difunctional urethane acrylate has a molecular weight of greater than 1,500 g/mol.

12. The liquid radiation-curable coating composition according to claim 10, wherein the difunctional urethane acrylate comprises reacted units of isophorone diisocyanate.

13. The liquid radiation-curable coating composition according to claim 12, wherein the difunctional urethane acrylate further comprises reacted units of a monofunctional acrylate.

14. The liquid radiation-curable coating composition according to claim 12, wherein the difunctional urethane acrylate comprises reacted units of one or more cyclic diols.

15. The liquid radiation-curable coating composition according to claim 1, further comprising 2-hydroxy-2-methyl-1-phenylpropan-1-one as a photoinitiator.

16. The liquid radiation-curable coating composition according to claim 1, wherein the vinylphosphonic acid is present in an amount of from 0.5 to 4% by weight based on the total weight of the composition.

17. The liquid radiation-curable coating composition according to claim 12, further comprising one or more α,β-ethylenically unsaturated carboxylic acids.

18. The liquid radiation-curable coating composition according to claim 1, comprising at least one compound selected from the group consisting of trimethylolpropane monoformal acrylate, glycerol monoformal acrylate, 4-tetrahydropyranyl acrylate, 2-tetrahydropyranyl methacrylate, and tetrahydrofurfuryl acrylate.

\* \* \* \* \*